United States Patent [19]  [11] 3,983,298
Hahn et al.  [45] Sept. 28, 1976

[54] POLYORGANOSILOXANE PRESSURE SENSITIVE ADHESIVES AND ARTICLES THEREFROM

[75] Inventors: James R. Hahn, Midland; James A. Vallender, Freeland, both of Mich.

[73] Assignee: Dow Corning Corporation, Midland, Mich.

[22] Filed: Apr. 18, 1975

[21] Appl. No.: 569,256

[52] U.S. Cl. .................... 428/355; 260/46.5 UA; 260/825; 428/422; 428/447
[51] Int. Cl.² .................. B32B 9/04; C08L 83/04
[58] Field of Search ............ 260/46.5 UA, 825; 428/355, 447

[56] References Cited
UNITED STATES PATENTS
3,527,842  9/1970  Clark .................................. 260/825

Primary Examiner—Lewis T. Jacobs
Attorney, Agent, or Firm—Roger H. Borrousch

[57] ABSTRACT

Curable polyorganosiloxane compositions are obtained from mixtures of a vinyl endblocked polydiorganosiloxane having a viscosity of from 20,000 to 100,000 centipoises, a benzene soluble resin copolymer of $R_3SiO_{1/2}$ units and $SiO_{4/2}$ units, an organopolysiloxane having silicon bonded hydrogen atoms and a platinum catalyst. The cured compositions are useful as pressure sensitive adhesives having high tack, good adhesive strength, and an exceptional resistance to creep, even at elevated temperatures.

14 Claims, No Drawings

POLYORGANOSILOXANE PRESSURE SENSITIVE ADHESIVES AND ARTICLES THEREFROM

BACKGROUND OF THE INVENTION

1. Field of the Invention

This invention relates to polyorganosiloxane compositions that are curable to produce pressure sensitive adhesives and to methods of making the cured compositions. This invention also relates to articles comprising a support carrying the cured compositions of this invention.

2. Description of the Prior Art

The term, pressure sensitive adhesive, as used herein refers to adhesives that can be adhered to a surface and yet can be stripped from said surface without transferring more than trace quantities of adhesive to the surface, and can be readhered to the same or another surface because the ahdesive retains some or all of its tack and adhesive strength.

Pressure sensitive adhesives, hereinafter also referred to as PSAs, comprising polyorganosiloxanes are not new. Various mixtures of a benzene soluble resin copolymer comprising $R_3SiO_{1/2}$ units and $SiO_{4/2}$ units, hereinafter also referred to as M and Q respectively, and a hydroxyl endblocked polydiorganosiloxane have been disclosed which have PSA characteristics. U.S. Pat. Nos. 2,736,721; 2,814,601; 2,857,356; 3,528,940 and British Patent Specification No. 998,232 teach such mixtures. However, all said mixtures, whether cured or not, either require large amounts of solvent for the purpose of reducing the viscosity of the PSA to a manageable level or they display inferior adhesive strength for many applications or they do not yield PSAs which have adequate resistance to creep at high temperature or they suffer from a combination of these shortcomings.

When the prior art mixtures of a low viscosity, vinyl endblocked polydiorganosiloxane or a hydroxyl free polydiorganosiloxane and a benzene soluble resin copolymer comprising $R_3SiO_{1/2}$ units and $SiO_{4/2}$ units, are cured, PSAs are not obtained. U.S. Pat. Nos. 3,057,469; 3,284,406; 3,839,075, and British Patent Specification No. 972,594 teach such mixtures to be tack free potting compositions, primer compositions for a known PSA, vibration damping compositions and flexible casting resins.

The PSA art has long felt the need for a polyorganosiloxane PSA having high tack, good adhesive strength, excellent resistance to creep, even at high temperature and low solvent content. It is unexpected to obtain these qualities by combining certain components in critical combinations and curing the resulting mixture.

SUMMARY OF THE INVENTION

It is a primary object of this invention to provide a polyorganosiloxane PSA having high tack, good adhesive strength, and excellent resistance to creep at high temperature. It is another object of this invention to provide a high performance polyorganosiloxane PSA that needs very little solvent to aid in its workability.

This invention relates to a composition of matter having, in the cured state, a tack of greater than $80g/cm.^2$, preferably greater than $100g/cm.^2$, an adhesive strength greater than 55 kg./m., preferably greater than 65 kg./m., nil creep, especially at high temperature and a hold time greater than 15 minutes, preferably greater than 60 minutes and requiring no more than 10 percent by weight of solvent to improve workability in the uncured state, consisting essentially of a composition obtained by mixing a vinyl endblocked polydiorganosiloxane fluid, a benzene soluble resin copolymer having $R_3SiO_{1/2}$ units and $SiO_{4/2}$ units, an organopolysiloxane having silicon bonded hydrogen atoms for the purpose of curing the composition and developing the PSA properties, and a platinum catalyst for the curing process.

DESCRIPTION OF THE INVENTION

This invention relates to a composition, suitable for use as a pressure sensitive adhesive, obtained by mixing components consisting essentially of (a) from 50 to 60 parts by weight of a solid, benzene soluble resin copolymer consisting essentially of $R_3SiO_{1/2}$ units and $SiO_{4/2}$ units, where R is a monovalent hydrocarbon radical containing no more than six carbon atoms, there being from 0.6 to 0.9 inclusive $R_3SiO_{1/2}$ units for every $SiO_{4/2}$ unit, at least 95 percent of all R radicals in (a) being methyl and the total number of R radicals in (a) that have olefinic unsaturation being no more than 0.5 percent, preferably zero percent, of all R radicals in (a), (b) from 40 to 50 parts by weight of an essentially cyclic free, polydiorganosiloxane of the average formula $$CH_2=CHR''_2SiO(R'_2SiO)_nSiR''_2CH=CH_2$$

where R' is selected from the group consisting of methyl, ethyl, propyl, and phenyl, at least 95 percent of all R' radicals being methyl, R'' is any R' as defined above and n has an average value such that the viscosity of the polydiorganosiloxane (b) has a value of from 20,000 to 100,000 centipoises at 25°C., the total of (a) and (b) being 100 parts by weight, (c) an amount of an organopolysiloxane compatible with the mixture of (a) and (b) and having an average unit formula

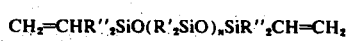

where R''' is any R' radical as defined above, $a$ has a value of from 1.00 to less than 2.00, $b$ has a value of from 0.05 to 1.00, the sum of $a$ plus $b$ being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1.0 to 20.0 silicon bonded hydrogen atoms for every olefinically unsaturated radical in the total of (a) plus (b), and (d) a platinum containing catalyst in sufficient quantity to provide at least 0.1 part by weight platinum for every one million parts by weight of the combined weight of (a), (b) and (c).

All of the individual components of the compositions of this invention, and their combination generally, are well known in the art, but their combination in critical ratios and their curing to yield superior PSAs is not previously known or obvious.

Resin copolymer (a), which is a solid, resinous polyorganosiloxane composed of M units and Q units can be prepared by any of the known methods. For example, cohydrolysis of an appropriate amount of each of the silanes of the formulae

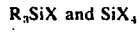

to give M units and Q units respectively in the desired M/Q ratio in the resin copolymer (a) can be used when X is a hydrolyzable group such as alkoxy. Preferably, resin copolymer (a) is prepared by the method of Daudt and Tyler, U.S. Pat. No. 2,676,182 which is hereby incorporated by reference, to show the method of preparation and the compositions that are obtainable. Briefly, the method of Daudt and Tyler comprises reacting under acidic conditions, a silica hydrosol with organosubstituted siloxanes, for example, hexamethyldisiloxane, or hydrolyzable organosubstituted silanes, for example, trimethylchlorosilane, or their mixtures and recovering a benzene soluble resin copolymer having M and Q units.

Regardless of the method of preparation, the weight of the resin copolymer (a) and the ratio of M units to Q units in the resin copolymer (a) that is used in this invention is based on the non-volatile portion of the resin copolymer. To determine the non-volatile portion of the resin copolymer a known weight of resin copolymer, as prepared, preferably dissolved in a volatile solvent such as toluene or xylene is heated at 150°C. for 3 hours to yield a residue. The non-volatile portion of the resin copolymer is the residue. The amount of the non-volatile portion of the resin copolymer is often based on the weight of the organic solvent solution of the resin copolymer and is expressed as "percent solids".

The R groups in the M units of (a), which may be identical or different, are monovalent hydrocarbon radicals containing no more than six carbon atoms such as alkyl radicals such as methyl, ethyl, and isopropyl; cycloaliphatic radicals such as cyclopentyl and cyclohexenyl; olefinic radicals, such as vinyl and allyl; and the phenyl radical. Typical M units are

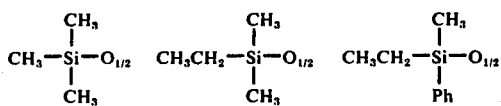

where Ph is, above and hereinafter, the phenyl radical. It is preferred that at least 95 percent of all the R radicals in (a) are methyl and that essentially all of the radicals are free of olefinic unsaturation. While up to 0.5 percent of all R radicals in (a) can be olefinically unsaturated, such as vinyl, the PSAs of this invention are not obtained if more than 0.5 percent of the R radicals in (a) have olefinic unsaturation.

The Q units in (a) are essentially all siloxane units, containing no silicon bonded carbon atoms and are derived directly from the silica hydrosol in the preferred method of Daudt and Tyler. It should be understood that the resin copolymers (a) that are operable in this invention often have as much as 3 to 4 percent by weight, based on the total weight of (a), of hydroxyl radicals bonded directly to the silicon atom of the Q units, the actual amount of said hydroxyl radicals being dependent upon the method of preparation of the resin copolymer.

Resin copolymers (a) that are operable in this invention are soluble in benzene and have a ratio of M units to Q units whose value is from 0.6:1.0 to 0.9:1.0. The M/Q ratio in (a) can be determined by one or more standard analytical techniques such as elemental analysis, infra-red spectroscopy, nuclear magnetic reasonance spectroscopy, etc. For example, in a resin copolymer having only trimethylsiloxane units and silica units, a knowledge of the percent by weight of carbon in the resin copolymer (a) is sufficient to establish its M/Q ratio.

The best PSAs of this invention are obtained when copolymer (a) consists essentially of

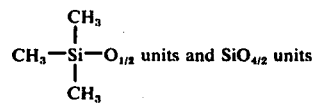

in the stated ratio. It is to be understood that trace amounts of diorganosiloxane units and monoorganosiloxane units are within the scope of this invention as components in resin copolymer (a).

Polydiorganosiloxanes (b) are well known vinyl end-blocked siloxanes of the average formula

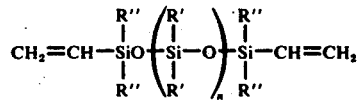

Polydiorganosiloxanes (b) can be prepared by any of the conventional methods for preparing triorganosiloxane terminated polydiorganosiloxanes. For example, a proper ratio of the appropriate hydrolyzable silanes, e.g. vinyldimethylchlorosilane and dimethyldichlorosilane, may be cohydrolyzed and condensed or alternately an appropriate 1,3-divinyltetraorganodisiloxane, e.g. symmetrical divinyldimethyldiphenyldisiloxane, which furnishes the endgroups of the polydiorganosiloxane, may be equilibrated with an appropriate diorganopolysiloxane e.g. dimethylcyclotetrasiloxane, in the presence of an acidic or basic catalyst. Regardless of the method of preparation of polydiorganosiloxane (b) there is usually coproduced a varying quantity of volatile, cyclic polydiorganosiloxanes. The amount used of polydiorganosiloxane (b), its average formula, and its viscosity, for the purposes of this invention, refers to the essentially cyclic free portion of the polydiorganosiloxane. This essentially cyclic free portion can be determined by heating a sample of the polydiorganosiloxane at 150°C. for 3 hours to yield a residue. This residue will be essentially free of cyclic material with the exception of trace quantities of macrocyclic polydiorganosiloxanes which are non-volatile at 150°C. and atmospheric pressure. Many of these polydiorganosiloxanes (b) are commercially available. Furthermore, component (b) can be homopolymers or copolymers or their several mixtures as long as they are vinyl endblocked polydiorganosiloxanes of the stated average formula.

The terminal units of component (b) are triorganosiloxane units in each of which one of the organic groups is a vinyl group that is bonded directly to the silicon atom of the terminal unit. The two R'' radicals in each terminal unit of (b) are any of the R' radicals defined above, but are preferably selected from the group consisting of methyl and phenyl. Preferred terminal units for siloxane (b) are vinyldimethylsiloxane units and vinylphenylmethylsiloxane units.

The polymer chain of polydiorganosiloxane (b), exclusive of terminal units, is made up of diorganosiloxane units containing R' radicals which can all be identical or a mixture of R' radicals. Trace amounts of $R'_3SiO_{1/2}$ units, $R'SiO_{3/2}$ units and $SiO_{4/2}$ units are permissible in (b). R' is selected from the group consisting of methyl, ethyl, propyl, and phenyl, with at least 95 percent, and preferably 100 percent, of all R' in (b) being the methyl radical.

Specific examples of component (b) are

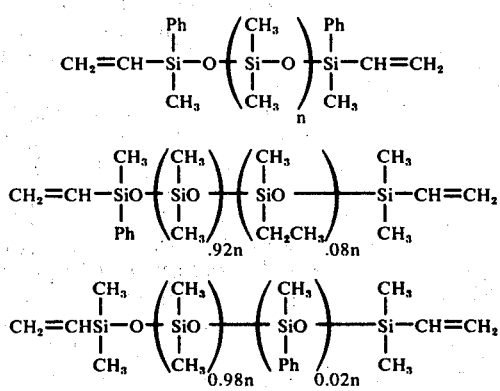

The value of $n$ is such that the viscosity of component (b) is between 20,000 and 100,000 centipoises when measured at 25°C. Depending on the type of R' radicals in (b) the permissible average value of $n$ will vary. In the case of the polydimethylsiloxane fluids, $n$ will have an average value from approximately 650 to 1000. A preferred viscosity for polydiorganosiloxane (b) is from approximately 35,000 to 65,000 centipoises at 25°C.

Component (c) is an organopolysiloxane of the average unit formula $$R'''_a H_b SiO_{\frac{4-a-b}{2}}$$

having silicon bonded hydrogen atoms that are reactive with silicon bonded vinyl radicals in the presence of a platinum catalyst. R''' can be any R' radical as defined above, but preferably R''' is methyl or phenyl. In order to be effective for this invention, component (c) must be compatible with, and preferably soluble in, the mixture of (a) and (b). By "compatible", it is meant that the required amount of organopolysiloxane (c) is at least partially soluble in the mixture of (a) and (b) and will exist in a uniformly dispersed state in the compositions of this invention while participating in the curing reaction, until the cure has been effected.

In component (c), $a$ has a value of from 1.00 to less than 2.00, $b$ has a value of from 0.05 to 1.00 and the sum of $a$ plus $b$ has a value of from 1.10 to less than 3.00. Furthermore, component (c) must have an average of greater than 2, for example 2.1, 2.5, 3, 5, 10, and more, and preferably, at least 3 silicon bonded hydrogen atoms per molecule, no silicon atom bearing more than one silicon bonded hydrogen atom.

Illustrative of component (c) which are operative in the present invention are $Si(OSiMe_2H)_4$, $Me_3SiO(Me_2SiO)_3(MeHSiO)_5SiMe_3$, $Me_3SiO(MeHSiO)_{10}SiMe_3$, $(MeHSiO)_{3,4,5}$ $Si(OSiPhMeH)_4$ $PhSi(OSiMe_2H)_3$ and their several mixtures, including their mixtures with other organopolysiloxanes having less than three silicon bonded hydrogen atoms per molecule; copolymers of $SiO_{4/2}$, $Me_2SiO_{2/2}$, and $Me_2HSiO_{1/2}$, copolymers of $Me_3SiO_{1/2}$, $Me_2HSiO_{1/2}$, $MeHSiO_{2/2}$, and $Me_2SiO_{2/2}$, etc. Organopolysiloxanes (c) that have at least one R''' group, preferably a methyl group bonded to the silicon atoms that bear the reactive hydrogen atoms are preferred. It is to be understood that component (c) can be a single compound or a mixture of compounds as long as the average unit formula is as indicated and the indicated compatibility is realized.

The platinum catalyst (d) is any of the well known forms of platinum that are effective for catalyzing the reaction of silicon bonded hydrogen atoms with silicon bonded vinyl groups, such as finely divided metallic platinum, platinum on a finely divided carrier such as alumina, compounds of platinum such as chloroplatinic acid and complexes of platinum compounds. A particularly useful form of platinum, especially in those formulations where the catalyst is to be exposed to heat during the preparation of the composition or when the components are mixed by a diffusion process, is bis(tri-n-butylphosphine)dichloro$\mu,\mu'$-dichloroplatinum (II). Another useful form of platinum is the polysiloxane solution of chloroplatinic acid described in U.S. Pat. No. 3,419,593. Catalysts (d) that are soluble in the mixture of (a) plus (b) plus (c) are preferred, especially where optical clarity is desired.

It should be noted that platinum free catalysts that are effective for curing the prior art polyorganosiloxane pressure sensitive adhesives, such as organic peroxides and metallic salts of carboxylic acid, are ineffective for producing the PSAs of this invention, when used in place of component (d).

In the compositions of this invention resin copolymer (a) is present in from 50 to 60, preferably from 55 to 58.5 parts by weight and polydiorganosiloxane (b) is present in from 40 to 50, preferably from 41.5 to 45 parts by weight, and the total of (a) plus (b) is 100 parts. When the resin copolymer (a) is less than 50 percent by weight of the total of (a) plus (b), the PSAs of this invention will not be obtained since the cured composition will lack suitable adhesive strength and hold time. When the resin copolymer (a) is greater than 60 percent by weight of the total of (a) plus (b), the viscosity of the uncured composition is excessively high and also a decrease in tack in the cured PSA is experienced.

The organopolysiloxane (c) is present in an amount that is sufficient to provide from 1.0 to 20.0, preferably from 2.0 to 5.0, silicon bonded hydrogen atoms for every olefinically unsaturated radical in the total of (a) plus (b). The number of olefinically unsaturated radicals in (a) and (b) and the number of silicon bonded hydrogen atoms in any given quantity of (c) can be determined by analytical techniques that are standard to the organosilicon art.

The platinum catalyst (d) is present in an amount sufficient to provide at least 0.1 part by weight platinum for one million parts by weight of the combined weight of (a), (b), and (c). Frequently, such small amounts of catalyst are poisoned by trace quantities of impurities in the composition so it is advantageous to employ the platinum catalyst in such quantities to provide at least 1.0 ppm platinum. The amount of platinum catalyst is not critical with respect to the upper limit but its cost would suggest that excessive quantities should be avoided. Amounts of up to 200 ppm platinum are not unusual but preferably from 1 to 35 parts by weight of platinum for every one million parts by weight of (a) plus (b) plus (c) is used.

The components of the compositions of this invention can be mixed in any manner such as in bulk or in organic solvent. Since the resin copolymer (a) is a solid and is conveniently prepared and handled in an organic solvent, the preparation of the compositions of this invention preferably employs an organic solvent, at least for the mixing of (a) and (b). The organic solvent can be any of the solvents conventionally used with organosiloxanes and having a boiling point below approximately 250°C., such as aromatic hydrocarbons such as benzene, toluene, and xylene; aliphatic hydrocarbons such as hexane, heptane and cyclohexane; halogenated hydrocarbon solvents such as trichloroethane and chloroform; naphthas such as petroleum ether, VM and P Naphtha and refined naphthas such as Naphthalite 66/3 and oxygenated solvents such as hydrocarbon ethers such as tetrahydrofuran and the dimethylether of ethylene glycol, ketones such as methyl isobutyl ketone and esters such as ethyl acetate, etc. Mixtures of said organic solvents can be also used. Mixing of said components can be accomplished by any of the techniques that are known in the polymer art such as milling, blending, stirring, etc., either in batch or in continuous process.

The compositions of this invention are obtained whenever the components (a), (b), (c), and (d) are mixed together in the stated proportions. The order of mixing of the components is not critical, except that the organopolysiloxane (c) and the platinum catalyst (d) are preferably brought together last. If heat is used in the preparation of the compositions of this invention it is preferred to add the organopolysiloxane (c) after all heating operations in the preparation process have been completed. For example, (a), and (b) can first be mixed with heating and then (c) and (d) added in any sequence or simultaneously to the cooled mixture of (a) and (b). Alternately, a mixture of (a), (b), and (d) can be prepared with heating and (c) subsequently added to the cooled mixture of (a), (b), and (d). Furthermore, a mixture of (a), (d), and a portion of (b) can be prepared with heating and the balance of (b) and all of (c) can be added in any sequence or simultaneously to the cooled mixture. Obviously many other mixing procedures are possible and are encompassed by this invention whenever the components (a), (b), (c), and (d) are mixed together in the stated proportions.

The best method of preparing the compositions of this invention is to mix the resin copolymer which may be dissolved in about an equal weight of an organic solvent to facilitate mixing, with the polydiorganosiloxane. In this best method a sufficient quantity of the resin copolymer, whose non-volatile content has been determined, is used to contain the desired weight of non-volatile resin copolymer (a). In like manner, a sufficient quantity of polydiorganosiloxane, whose essentially cyclic free content has been determined, is used to contain the desired weight of essentially cyclic free polydiorganosiloxane (b). Of course, the non-volatile resin copolymer (a) and/or the essentially cycic free polydiorganosiloxane (b) can be prepared separately and then mixed, with or without the aid of solvent. For this method the resin copolymer and the polydiorganosiloxane should be devolatilized under conditions equivalent to heating for 3 hours at 150°C. at atmospheric pressure in order to obtain optimum PSA properties. Obviously, excessively high temperatures should be avoided when components (a) and (b) or their mixtures are being devolatilized. A temperature of 200°C., and preferably 150°C., should not be exceeded. The mixture of (a), (b), and solvent is devolatilized in thin film at 150°C. at a pressure of about 8 mm. of mercury. Additional solvent may be added to the cooled, devolatilized mixture of (a) and (b) to obtain a desired viscosity. Organopolysiloxane (c), and catalyst (d) are added to the devolatilized mixture of (a) and (b) to complete the composition and curing of the composition begins, unless a platinum catalyst inhibitor described below has been added. The platinum catalyst inhibitor, if added, is best added to the cooled, devolatilized mixture of (a) and (b).

Small amounts of additional ingredients may be added to the compositions of this invention if desired. For example, antioxidants, pigments, stabilizers, fillers, etc., may be added as long as they do not materially reduce the PSA properties of these compositions. Volatile additives are preferably added after any solvent removal operations have been completed.

When components (a), (b), (c), and (d), are mixed, the composition begins to cure at a rate which is directly proportional to the temperature of the composition. The compositions of this invention can be cured at room temperature or cured by heating. When heat curing is employed, a temperature from about 70° to 200°C., preferably from 100° to 150°C., is employed, whereupon curing proceeds in about one hour or less. The exceptional PSA characteristics of these compositions are developed when the composition is cured and the cured composition is essentially free of organic solvent.

Preferably the uncured compositions of this invention should be used within a few hours after being prepared, although this time interval from preparation to use, otherwise known as "shelf life", can be extended to several days by cooling the mixture to a temperature of −20°C. or below. Equally long or longer "shelf life" can be realized by mixing a platinum catalyst inhibitor with the curable mixture.

Platinum catalyst inhibitors which are useful in the compositions of this invention and which display varying lengths of cure time inhibition in our compositions are those described in U.S. Pat. Nos. 3,188,299, 3,188,300, 3,192,181, 3,344,111, 3,383,356, 3,445,420, 3,453,233, 3,453,234, and 3,532,649, and others which may be known in the art.

The effectiveness of a platinum catalyst inhibitor depends on many factors such as its chemical composition, its physical properties, its concentration, etc. For the purposes of this invention an effective amount of any particular platinum catalyst inhibitor can be determined by routing experimentation. Since many platinum catalyst inhibitors are relatively volatile it is preferable to add them to the compositions of this invention after any heating and/or vacuum operations of the preparative process have been completed. For maximum effectiveness, however, a platinum catalyst inhibitor should be added to the compositions of this invention at least simultaneously with, and preferably prior to the mixing of components (c) and (d).

The compositions of this invention, when containing a platinum catalyst inhibitor, can be cured by removing the inhibitor, for example, by evaporation at room temperature or higher. Curing can also be accomplished in most cases by heating the compositions to a temperature of from 70° to 200°C., preferably from 100° to 150°C.

A preferred form of this invention is a mixture of (a), (b), (c), and (d), curable with heat, and having a platinum catalyst inhibitor in an amount effective to inhibit the catalytic action of the platinum containing catalyst below a temperature of approximately 70°C.

The uncured compositions of this invention can be used as a solution in one or more of the organic solvents described above or said compositions can be used with no solvent present. While it is possible to use as much as 50 percent and more of an organic solvent, it is usually sufficient to employ no more than 10 percent, and frequently as little as about 5 percent by weight, based on the total weight of the composition, of one or more of the organic solvents described above to aid in the application of said compositions. This can be accomplished simply by not removing all of the solvent that is used in the preparation of said compositions. Alternately, all of the solvent that is used in the preparation of the compositions of this invention can be removed and the desired amount of the same or another solvent can be added. It will be obvious to those skilled in the art that in the case where the solvent that is used to aid in the application of the compositions of this invention has a higher boiling point than the solvent used in their preparation, the necessary solvent change can be accomplished in two steps as described above or in a one step process wherein the higher boiling point solvent is present in the mixture during the removal of the lower boiling solvent. If, during the preparation of the compositions of this invention, any portion of the solvent is removed, particularly if heat and/or vacuum is used to remove said solvent, it is preferred to remove said solvent prior to the addition of other volatile components such as component (c). Said removal of solvent can be accomplished by any of the known techniques such as entrainment in a stream of inert gas, evaporation, distillation, thin film stripping, etc., and at any combination of temperature and pressure where the temperature is not allowed to exceed approximately 200°C., preferably about 150°C.

The compositions of this invention are useful as pressure sensitive adhesives and will readily stick to any known solid support, whether flexible or rigid. The composition is simply applied to a surface of the support by any suitable means such as rolling, spreading, spraying, etc. and cured as described above. It should be understood that the use of the compositions of this invention encompasses not only the application of the completed, uncured composition to a surface but also the preparation of said composition on said surface. For example, it is within the scope of this invention to apply a layer of a mixture of (a), (b), and (d) to a solid support and then add the organopolysiloxane (c), the needed mixing being accomplished by diffusion of (c) into the layer of (a), (b), and (d). It is preferred to delay the curing reaction until (c) is thoroughly diffused into the layer on the support. Any solvent that is present in the cured composition is preferably allowed to evaporate before the surface bearing the composition is adhered to a substrate, although this is not necessary.

The surface of the support and the substrate to which the support is adhered may be any known solid material such as metals such as aluminum, silver, copper, iron and their alloys; porous materials such as paper, wood, leather, and fabrics; organic polymeric materials such as polyolefins such as polyethylene and polypropylene, fluorocarbon polymers such as polytetrafluoroethylene and polyvinylfluoride, silicone elastomers, silicone resins, polystyrene, polyamides such as Nylon, polyesters and acrylic polymers; painted surfaces; siliceous materials such as concrete, bricks, cinderblocks, and glass such as glass cloth; etc. Porous materials such as glass cloth are often impregnated with a substance that will prevent the migration of the PSA from one surface to another surface of the support. It is also well known to chemically treat the surface of a fluorocarbon polymer support to enhance the adhesion of a PSA to said surface.

Solid supports bearing the cured compositions of this invention are reliably adhered to any solid substrate because said compositions possess the desirable combination of high tack, good adhesive strength and excellent resistance to creep, especially at elevated temperatures. No single prior art organosilicon PSA composition offers all of these properties.

Useful articles which can be prepared with the PSAs of this invention include pressure sensitive adhesive tapes, labels, emblems and other decorative or informative signs, etc. An especially useful article is one comprising a support, flexible or rigid, that can withstand extreme temperatures, hot and/or cold, and carrying on at least one surface thereof, the polyorganosiloxane PSAs of this invention. Such an article makes full use of the stability and resistance to creep at high temperatures and the flexibility at low temperatures that the PSAs of this invention possess.

A preferred article is a pressure sensitive adhesive tape comprising an impregnated glass cloth support or a chemically treated fluorocarbon polymer support carrying on at least one surface thereof the cured compositions of this invention.

In order that those skilled in the art may better understand the present invention, the following examples are given to illustrate but not to limit the invention which is fully delineated by the appended claims.

Adhesion was determined according to ASTM D-1000 which is hereby incorporated by reference to show the method of test sample preparation and testing.

Creep was determined according to Mil-T-81287, hereby incorporated by reference, wherein PSA is applied at a thickness of 2 to 3 mils to the full width of one end of a one inch wide strip of a 2-mil aluminum foil for a distance greater than one inch from said end and the PSA is cured. Two thus-treated aluminum strips are overlapped in parallel fashion at their adhesive bearing ends for a distance of one inch and adhered with a force of a rolled 10 lb. (4.5 kg.) weight. The adhered strips are then fixed in a vertical orientation with the upper strip being secured and the lower strip bearing a 100 gram weight. A maximum slippage of ½ inch (1.27 cm) is allowed after heating the adhered strips for 1 hour to 500°F. and 1 hour at 500°F.

Hold time was determined as follows. PSA was applied at a thickness of 2–3 mil to ½ inch strips of 2-mil aluminum foil. After curing the PSA, the strips were overlapped ½ inch at one end, pressed together with a 4.5 pound (2.0 kg.) rolled weight and suspended vertically with the upper strip secured by its non-overlapped end and the lower strip bearing a 3,000 gram weight at its non-overlapped end. Hold time is the time elapsed before the strips part while being held in such a configuration at room temperature.

Tack was measured on cured, unadhered PSA applied at a thickness of 2 to 3 mil to 2-mil aluminum foil. A Polyken Probe Tack Tester, manufactured by Testing Machines Incorporated, was fitted with a rough probe and operated at a 1 cm/sec. closure rate, a 1 sec. dwell time and a 100g/cm² probe force to measure tack.

EXAMPLE 1

A benzene soluble resin copolymer consisting essentially of trimethylsiloxane units (M units) and silica units (Q units) was prepared according to U.S. Pat. No. 2,676,182. A xylene solution of the resin copolymer had a specific gravity of 1.021, a viscosity at 25°C. of 10.81 centipoises and a non-volatile resin copolymer content (percent "solids") of 63.2 percent by weight. The solid resin copolymer had a hydroxyl content of 1.53 percent by weight and a carbon content of 22.7 percent by weight. Assuming all carbon to be present as trimethylsiloxane units, a resin having an M/Q ratio of 0.77:1.00 was obtained.

EXAMPLE 2

A mixture of 50 grams of an essentially cyclic free vinyl endblocked polydimethylsiloxane having a vinyl content of 0.09 percent by weight and a viscosity of 52,000 centipoises at 25°C. and 105g. of the resin copolymer solution of Example 1 was heated in a sigma blade dough mixer at 150°C. and 8 mm. of Hg pressure for 1.5 hours to remove volatile material. The resulting mixture contained 57 percent by weight resin copolymer and 43 percent by weight vinyl endblocked polydimethylsiloxane. Twenty grams of this devolatilized mixture was diluted with about 1.5g. of xylene and the resulting solution was mixed with 0.044g. of an organopolysiloxane fluid comprising trimethylsiloxane units, dimethylsiloxane units and methylhydrogensiloxane units having a silicon bonded hydrogen content of about 0.8 percent by weight, and an average of about 10 silicon atoms per molecule, an average of five of which contain silicon bonded hydrogen atoms. This gave an SiH/SiVi ratio of about 2.5/1 in the mixture. The mixture was catalyzed with 0.073 g. of a polyorganosiloxane solution of chloroplatinic acid having 0.63 percent by weight platinum resulting in a platinum concentration of 23 ppm. Pt. The cure was inhibited with one drop of methylbutynol. The uncured composition was applied in a 2 to 3 mil thick layer to aluminum foil having a thickness of 2 mils, using a set of stainless steel rollers spaced at about 7 mils. The coating of the aluminum foil was devolatilized at 70°C. for 5 minutes and cured at 150°C. for 20 minutes. Similar aluminum test samples were prepared with PSAs containing other resin loadings and other SiH/SiVi ratios using components from the same lots. These formulations and the resulting PSA properties are summarized in Table I. The measure of tack in this table was a qualitative estimation based on touching the PSA with a finger.

Table I

| Parts Resin Copolymer/<br>Parts Polydimethylsiloxane | SiH/SiVi | Adhesion (kg./m.) | Tack[2] | Hold Time (hours) |
| --- | --- | --- | --- | --- |
| 60/40 | 2.5/1 | 96 | Fair | 19.5 |
| 58/42 | 2.5/1 | 89 | Fair–Good | 5.9 |
| 58/42 | 4.2/1 | 77 | Fair | 17.2 |
| 57/43 | 2.5/1 | 85 | Fair–Good | 3.3 |
| 56/44 | 2.5/1 | 76 | Good | 1.2 |
| 56/44[1] | 2.8/1 | 75 | Good | 2.1 |
| 56/44 | 4.2/1 | 77 | Very Good | 5.2 |
| 56/44[1] | 4.4/1 | 68 | Fair | 3.3 |

([1]) Vinyl endblocked polydimethylsiloxane contained 0.11 percent by weight vinyl and a viscosity of approximately 35,000 cp. at 25°C.
([2]) All samples were tacky, but those designated as fair were estimated to be of marginal value for the purposes of this invention.

EXAMPLE 3

A first mixture of 56 percent by weight of a nonvolatile resin copolymer having a trimethylsiloxane/silica ratio of from 0.6:1 to 0.9:1 and 44 percent by weight of a essentially cyclic free phenylmethylvinylsiloxane terminated polydimethylsiloxane having a viscosity of about 40,000 centipoises was prepared as in Example 2 except that the polydimethylsiloxane that was used to prepare the first mixture and the second mixture was not previously made essentially cyclic free. A second mixture was prepared which was similar to the first mixture except that approximately 4 percent of the organic radicals in the resin copolymer were the vinyl radical and the balance were the methyl radical. Four PSAs were prepared from these two mixtures as described in Example 2 consisting of 50 grams of a mixture of the first mixture and the second mixture taken in the proper amounts to provide various vinyl contents, 0.038g. of the platinum containing catalyst, 0.008g. of methylbutynol and a sufficient amount of the hydrogen bearing organopolysiloxane of Example 2 to produce a SiH/SiVi ratio of 4:1 in the mixture. Curing was done as described in Example 2. All data are summarized in Table 2. Tack was evaluated as described in Example 2.

Table II

| Vinyl Radicals in Resin (% of R radicals in resin) | SiH Crosslinker, g. (SiH/SiVi = 4.0) | Tack[3] | Adhesion (kg./m.) | Hold Time (Hours) |
|---|---|---|---|---|
| 0 | 0.94 | Good | 95 | 24+ |
| 0.4 | 1.49 | Fair | 75 | 11 |
| 0.8 | 2.52 | Poor | 51 | 6 |
| 4 | 10.7 | None | None | 0 |

[3]Relative rating among the samples. The first two samples (0% and 0.4% vinyl radicals) displayed acceptable tack.

EXAMPLE 4

Three resin copolymers having a trimethylsiloxane/silica ratio between 0.6:1 and 0.9:1, each having a different silicon bonded hydroxyl content, were used to prepare three mixtures comprising 56 parts by weight of the non-volatile resin copolymer and 44 parts by weight of an essentially cyclic free phenylmethylvinylsiloxane terminated polydimethylsiloxane having a viscosity of approximately 29,000 centipoises at 25°C. One hundred grams of each mixture was diluted with 5 grams of Naphthalite 66/3 and the solution was cured with 1.07 grams of the organopolysiloxane of Example 2, 0.07 grams of a platinum containing catalyst and one drop of methylbutynol. In the completed composition there was a SiH/SiVi ratio of 4.0/1 and a platinum concentration of 4.5 ppm. Aluminum test strips were prepared and tested as described above. The results are summarized in Table III. Tack was measured with the Polyken Probe Tack Tester.

Table III

| Hydroxyl Content (w% of resin) | Adhesion (kg./m.) | Tack (gm/cm²) | Hold Time (hours) | Creep (cm.) |
|---|---|---|---|---|
| 1.53 | 74 (51)[4] | 209 (50)[4] | 24 | nil |
| 2.23 | 68 (39)[4] | 170 (77)[4] | 24 | nil |
| 3.20 | 84 (50)[5] | 191 | 14+ | nil |

[4]Value in parenthesis was obtained after 4 hours at 260°C.
[5]Value in parenthesis was obtained after 6 hours at 260°C.

EXAMPLE 5

A mixture of 56 parts by weight of a benzene soluble resin copolymer having trimethylsiloxane units and silica units in a ratio of from 0.6:1 to 0.9:1, 44 parts by weight of a vinylphenylmethylsiloxane terminated polydimethylsiloxane having a viscosity of approximately 30,000 centipoise at 25°C. and 5 parts by weight of Naphthalite 66/3 was prepared according to the method of Example 3. Several 21 gram samples of this mixture were cured using either (A) a copolymeric siloxane comprising trimethylsiloxane units, dimethylsiloxane units and methylhydrogensiloxane units and having the average unit formula $Me_{1.7}H_{0.5}SiO_{0.9}$, and an average of about five silicon bonded hydrogen atoms per molecule or, (B) a copolymeric siloxane comprising dimethylhydrogensiloxane units and silica units and having the average unit formula $Me_{1.05}H_{.53}SiO_{1.21}$ and an average of greater than three silicon bonded hydrogen atoms per molecule. The cure was catalyzed with 0.07 grams of the platinum catalyst of Example 2 and shelf life was increased with 1 drop of methylbutynol. High tack, good adhesive strength and good hold time was achieved by all samples. Pertinent data are summarized in Table IV.

Table IV

| Curing Agent (g) | SiH/SiVi | Adhesion (kg./m.) | Tack (gm/cm²) | Hold Time (hrs) |
|---|---|---|---|---|
| 0.214 A[6] | 4/1 | 75 | 155 | 24+ |
| 0.429 A | 8/1 | 68 | 129 | 24+ |
| 0.857 A | 16/1 | 69 | 165 | 24+ |
| 0.117 B[7] | 2.5/1 | 78 | 138 | 1.76 |
| 0.188 B | 4/1 | 71 | 121 | 2.15 |
| 0.376 B | 8/1 | 67 | 93 | 2.28 |

[6]Curing Agent A is a copolymer of $Me_3SiO_{1/2}$ units, $Me_2SiO_{2/2}$ units and $MeHSiO_{2/2}$ units.
[7]Curing Agent B is a copolymer of $Me_2HSiO_{1/2}$ units and $SiO_{4/2}$ units.

EXAMPLE 6

A mixture of 82.3 parts of the resin solution of Example 1 and 48 parts of a vinyl endblocked polydimethylsiloxane having a viscosity of approximately 30,000 centipoises at 25°C. and an essentially cyclic free content of 85 percent was devolatilized at 150°C. for 3 hours at a pressure of 8 mm. of mercury to give a mixture that was 56 percent by weight non-volatile resin copolymer. Ninety-five parts of this mixture was thinned to a viscosity of 162,000 centipoises at 25°C. with 5 parts of organic solvent and further mixed with 0.5 parts of the organopolysiloxane (c) of Example 2, 0.1 parts of methylbutynol and 0.15 parts of the platinum catalyst of Example 2. An SiH/SiVi ratio of 5.7 and a catalyst concentration of 9.5 ppm Pt resulted. The composition was tested as described above and found to have high tack, an adhesive strength of 77 kg./m., and a hold time of at least 6 hours.

EXAMPLE 7

When the mixture of resin copolymer and polydimethylsiloxane of Example 6 is mixed with a sufficient amount of a toluene solution of bis(tri-n-butylphosphine)dichloro-µ,µ'-dichlorodiplatinum (II) to give approximately 8 ppm Pt in the mixture and the resulting mixture is devolatilized as in Example 6, a viscous, non-curing composition is obtained. This mixture can be melted and applied to a 2-mil aluminum foil as a layer approximately 3.5 mils in thickness. When the organopolysiloxane (c) of Example 2 is sprayed on the layer so as to supply 4 silicon bonded hydrogen atoms for every vinyl radical in the layer and the mixture is heated at 150°C. for 10 minutes the layer becomes a PSA with high tack, good adhesion and excellent resistance to creep at elevated temperatures.

That which is claimed is:

1. A composition suitable for use as a pressure sensitive adhesive, obtained by mixing components consisting essentially of
   a. from 50 to 60 parts by weight of a solid, benzene soluble resin copolymer consisting essentially of $R_3SiO_{1/2}$ units and $SiO_{4/2}$ units where R is a monovalent hydrocarbon radical containing no more than six carbon atoms, there being from 0.6 to 0.9 inclusive $R_3SiO_{1/2}$ units for every $SiO_{4/2}$ units, at least 95 percent of all R radicals in (a) being methyl and the total number of R radicals in (a) that have olefinic unsaturation being no more than 0.5 percent, preferably zero percent, of all R radicals in (a),
   b. from 40 to 50 parts by weight of an essentially cyclic free polydiorganosiloxane of the average formula $CH_2=CHR''_2SiO(R'_2SiO)_nSiR''_2CH=CH_2$ where R' is selected from the group consisting of methyl, ethyl, propyl, and phenyl, at least 95 percent of all R' radicals being methyl, R'' is any R' as defined above and n has an average value such that the viscosity of the polydiorganosiloxane (b) has a value of from 20,000 to 100,000 centipoise at 25°C., the total of (a) and (b) being 100 parts by weight,
   c. an amount of an organopolysiloxane compatible with the mixture of (a) and (b) and having an average unit formula $R'''_aH_bSiO_{\frac{4-a-b}{2}}$ where R''' is any R' radical as defined above, a has a value of from 1.00 to less than 2.00, b has a value of from 0.05 to 1.00, the sum of a plus b being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1.0 to 20.0 silicon bonded hydrogen atoms for every olefinically unsaturated radical in the total of (a) plus (b) and,
   d. a platinum containing catalyst in sufficient quantity to provide at least 0.1 part by weight of platinum for every one million parts by weight of the combined weight of (a), (b), and (c).

2. A composition, curable with heat to a composition suitable for use as a pressure sensitive adhesive, consisting essentially of
   a. from 50 to 60 parts by weight of a solid, benzene soluble resin copolymer consisting essentially of $R_3SiO_{1/2}$ units and $SiO_{4/2}$ units where R is a monovalent hydrocarbon radical containing no more than six carbon atoms, there being from 0.6 to 0.9 inclusive $R_3SiO_{1/2}$ units for every $SiO_{4/2}$ unit, at least 95 percent of all R radicals in (a) being methyl and the total number of R radicals in (a) that have olefinic unsaturation being no more than 0.5 percent, preferably zero percent, of all R radicals in (a),
   b. from 40 to 50 parts by weight of an essentially cyclic free polydiorganosiloxane of the average formula $CH_2=CHR''_2SiO(R'_2SiO)_nSiR''_2CH=CH_2$ where R' is selected from the group consisting of methyl, ethyl, propyl, and phenyl, at least 95 percent of all R' radicals being methyl, R'' is any R' as defined above and n has an average value such that the viscosity of the polydiorganosiloxane (b) has a value of from 20,000 to 100,000 centipoise at 25°C., the total of (a) and (b) being 100 parts by weight,
   c. an amount of an organopolysiloxane, compatible with the mixture of (a) and (b) and having an average unit formula $R'''_aH_bSiO_{\frac{4-a-b}{2}}$ where R''' is any R' radical as defined above, a has a value of from 1.00 to less than 2.00, b has a value of from 0.05 to 1.00, the sum of a plus b being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1.0 to 20.0 silicon bonded hydrogen atoms for every olefinically unsaturated radical in the total of (a) plus (b),
   d. a platinum containing catalyst in sufficient quantity to provide at least 0.1 part by weight of platinum for every one million parts by weight of the combined weight of (a), (b), and (c), and
   e. an amount of a platinum catalyst inhibitor effective to inhibit the catalytic action of the platinum containing catalyst (d) below a temperature of approximately 70°C.

3. The composition according to claim 2 wherein all R radicals in (a) are methyl.

4. The composition according to claim 2 wherein (b) is a vinylmethylorganosiloxane terminated polydimethylsiloxane having a viscosity of from approximately 35,000 to 65,000 centipoise at 25°C., wherein organo is methyl or phenyl.

5. The composition according to claim 4 wherein (a) is present in from 55 to 58.5 parts by weight, all R radicals in (a) are methyl, (c) is an organopolysiloxane composed of trimethylsiloxane units, dimethylsiloxane units and methylhydrogensiloxane units in a ratio of 2:3:5 and having an average of at least 3 silicon bonded hydrogen atoms per molecule, there being from 2.0 to 5.0 silicon bonded hydrogen atoms for every vinyl radical in (b) and (d) is a platinum containing catalyst that is soluble in the mixture of (a), (b), and (c) and providing from 1 to 30 parts by weight of Pt for every 1 million parts by weight of (a) plus (b) plus (c).

6. The composition according to claim 3 wherein (a) is present in from 55 to 58.5 parts by weight and the viscosity of (b) has a value of from approximately 35,000 to 65,000 centipoise at 25°C.

7. A method which comprises
  1. preparing an organic solvent solution of
     a. from 50 to 60 parts by weight of a solid, benzene soluble resin copolymer consisting essentially of $R_3SiO_{1/2}$ units and $SiO_{4/2}$ units where R is a monovalent hydrocarbon radical containing no more than six carbon atoms, there being from 0.6 to 0.9 inclusive $R_3SiO_{1/2}$ units for every $SiO_{4/2}$ unit, at least 95 percent of all R radicals in (a) being methyl and the total number of R radicals in (a) that have olefinic unsaturation being no more than 0.5 percent, preferably zero percent, of all R radicals in (a), and
     b. from 40 to 50 parts by weight of an essentially cyclic free polydiorganosiloxane of the average formula $CH_2=CHR''_2SiO(R'_2SiO)_nSiR'_2CH=CH_2$ where R' is selected from the group consisting of methyl, ethyl, propyl, and phenyl, at least 95 percent of all R' radicals being methyl, R'' is any R' as defined above and n has an average value such that the viscosity of the polydiorganosiloxane (b) has a value of from 20,000 to 100,000 centipoise at 25°C., the total of (a) and (b) being 100 parts by weight,
  2. removing organic solvent from the solution of (1) to obtain a devolatilized mixture having no more than 10 percent by weight, based on the total weight of the devolatilized mixture, of organic solvent,
  3. mixing with the devolatilized mixture of (2)
     c. an amount of an organopolysiloxane, compatible with the mixture of (a) and (b) and having an average unit formula

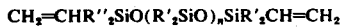

where R''' is any R' radical as defined above, $a$ has a value of from 1.00 to less than 2.00, $b$ has a value of from 0.05 to 1.00, the sum of $a$ plus $b$ being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1.0 to 20.0 silicon bonded hydrogen atoms for every olefinically unsaturated radical in the total of (a) plus (b),
     d. a platinum containing catalyst in sufficient quantity to provide at least 0.1 part by weight of platinum for every one million parts by weight of the combined weight of (a), (b), and (c), and
     e. an amount of a platinum catalyst inhibitor effective to inhibit the catalytic action of the platinum containing catalyst (d) below a temperature of approximately 70°C., to obtain a composition curable with heat to a pressure sensitive adhesive.

8. The method of claim 7 wherein organic solvent is added to produce a composition with no more than 10 percent by weight, based on the total weight of the composition, of an organic solvent.

9. The method of claim 7 wherein all R radicals in (a) are methyl.

10. The method of claim 9 wherein (a) is present in from 55 to 58.5 parts by weight, (b) has a viscosity of from approximately 35,000 to 65,000 centipoise at 25°C., all R' being methyl, (c) is an organopolysiloxane soluble in the combined (a) and (b), having at least 3 silicon bonded hydrogen atoms per molecule and providing from 2.0 to 5.0 silicon bonded hydrogen atoms for every silicon bonded vinyl radical in (b) and (d) is a platinum containing catalyst that is soluble in the mixture of (a), (b), and (c) and providing from 1 to 30 parts of platinum for every one million parts of (a) plus (b) plus (c).

11. As an article of manufacture, a solid support carrying on at least one surface thereof the cured composition of claim 2.

12. A pressure sensitive adhesive tape comprising a flexible support carrying on at least one surface thereof the cured composition of claim 2.

13. The pressure sensitive adhesive tape of claim 12 wherein the flexible support is impregnated glass cloth.

14. The pressure sensitive adhesive tape of claim 12 wherein the flexible backing is a chemically treated fluorocarbon polymer.

* * * * *

UNITED STATES PATENT AND TRADEMARK OFFICE
CERTIFICATE OF CORRECTION

PATENT NO. : 3,983,298
DATED : September 28, 1976
INVENTOR(S) : JAMES R. HAHN ET AL It is certified that error appears in the above-identified patent and that said Letters Patent are hereby corrected as shown below:

Column 17, line 37, should read
-- $CH_2=CHR''_2SiO(R'_2SiO)_n SiR''_2CH=CH_2$

Signed and Sealed this

*Twenty-fourth* Day of *June 1980*

[SEAL]

*Attest:*

SIDNEY A. DIAMOND

*Attesting Officer*   *Commissioner of Patents and Trademark*